United States Patent
Kim et al.

(10) Patent No.: US 8,998,182 B2
(45) Date of Patent: Apr. 7, 2015

(54) DAMPING DEVICE FOR BUILDING SEISMIC REINFORCEMENT

(71) Applicants: Kyungpook National University Industry-Academic Cooperation Foundation, Daegu (KR); Leader's Industrial Co., Ltd., Gyeongsangbuk-do (KR)

(72) Inventors: Cheol-Hwan Kim, Daegu (KR); Cheon-Gi Do, Daegu (KR)

(73) Assignees: Kyungpook National University Industry-Academic Cooperation Foundation (KR); Leader's Industrial Co., Ltd. (KR)

( * ) Notice: Subject to any disclaimer, the term of this patent is extended or adjusted under 35 U.S.C. 154(b) by 0 days.

(21) Appl. No.: 14/132,911

(22) Filed: Dec. 18, 2013

(65) Prior Publication Data

US 2014/0183802 A1 Jul. 3, 2014

(30) Foreign Application Priority Data

Dec. 27, 2012 (KR) .......................... 10-2012-0154562

(51) Int. Cl.
- *F16F 9/00* (2006.01)
- *F16F 13/00* (2006.01)
- *E04H 9/02* (2006.01)

(52) U.S. Cl.
CPC ............ *F16F 13/007* (2013.01); *E04H 9/027* (2013.01)

(58) Field of Classification Search
USPC ................ 267/33–35, 66–74, 221; 52/167.1, 52/167.3, 167.4, 167.6–167.9
See application file for complete search history.

(56) References Cited

U.S. PATENT DOCUMENTS

| | | | | |
|---|---|---|---|---|
| 3,659,834 A | * | 5/1972 | Suozzo | 267/70 |
| 3,776,536 A | * | 12/1973 | Henderson | 267/35 |
| 3,794,277 A | * | 2/1974 | Smedley et al. | 248/548 |
| 3,957,260 A | * | 5/1976 | Martin | 267/174 |
| 4,511,115 A | * | 4/1985 | Ludwigsen | 248/562 |
| 5,727,663 A | * | 3/1998 | Taylor | 188/378 |
| 5,870,863 A | * | 2/1999 | Taylor | 52/167.3 |
| 6,079,698 A | * | 6/2000 | Patterson et al. | 267/33 |
| 2003/0183994 A1 | * | 10/2003 | Atwater | 267/71 |
| 2011/0284333 A1 | | 11/2011 | Krog et al. | 188/313 |

FOREIGN PATENT DOCUMENTS

| | | | | |
|---|---|---|---|---|
| KR | 10-1171876 | | 11/2011 | ............ E04B 1/98 |
| KR | 10-1140160 | | 5/2012 | ............ E04B 1/98 |
| KR | 10-1176374 | | 8/2012 | ............ E04H 9/02 |

OTHER PUBLICATIONS

Notice of Preliminary Rejection; Korean Patent Application Serial No. 10-2012-0154562, dated May 29, 2013 with English translation (5 pgs).

* cited by examiner

*Primary Examiner* — Christopher Schwartz
(74) *Attorney, Agent, or Firm* — Hayes Soloway P.C.

(57) ABSTRACT

Provided is a damping device including a cylindrical body sealed with an inner cover and an outer cover at both ends, a support rod coupled to one end of the cylindrical body to perform an axial motion, the support rod including a moving plate having a damping orifice in the cylindrical body, the support rod including a nut configured to adjust a length of the support rod at an inner side end received in the cylindrical body, and a buffering device configured to store elastic energy in one of a first spring and a second spring based on a moving direction of the moving plate, the buffering device including the first spring inserted in the inner cover, the second spring inserted in the outer cover, and a lubricant in the cylindrical body.

1 Claim, 8 Drawing Sheets

DAMPING DEVICE FOR BUILDING SEISMIC REINFORCEMENT

CROSS-REFERENCE TO RELATED APPLICATION

This application claims the benefit of Korean Patent Application No. 10-2012-0154562, filed on Dec. 27, 2012, in the Korean Intellectual Property Office, the disclosure of which is incorporated herein by reference.

BACKGROUND

1. Field of the Invention

The present invention relates to a damping device for building seismic reinforcement, and more particularly, to a damping device for building seismic reinforcement that may be simply structured to increase the performance and durability of a building while preserving the beauty of the building, whereby a reduction in management costs through minimum maintenance may be expected.

2. Description of the Related Art

In general, a seismic design is strictly regulated in the Western United States or Japan where earthquakes occur frequently. In South Korea, seismic design provisions KBC2005 have been newly established to reinforce structural safety. There is an increasing trend of installing dampers in ferroconcrete buildings, for example, apartments, schools, and the like. Arts related to such a damper are disclosed in Korean Patent Publication No. 1171876, titled The damper for the earthquake-proof, published on Nov. 17, 2011 (Reference 1), and Korean Patent Publication No. 1176374, titled Seismic control brace apparatus and bracing method, published on Aug. 23, 2012 (Reference 2).

Reference 1 discloses a damper including a first fixed member including a first coupling portion and a first plastic pipe fixing portion, a second fixed member including a second coupling portion and a second plastic pipe fixing portion, a high-ductility metallic plastic pipe fixed to the first fixed member and the second fixed member, and a reinforcement pipe provided in a cylindrical form, the reinforcement pipe including a sealing member mounted between an inner circumference surface and an outer circumference surface, the reinforcement pipe configured to enable the second fixed member to perform a horizontal motion. The damper of Reference 1 may be expected to provide an effective response to seismic vibrations through a restoring force using air or fluid pressure and a restoring force using plastic deformation.

Reference 2 discloses a damper including a first cylinder, a second cylinder, a first elastic concrete inserted on a side of the first cylinder to apply an elastic force in a longitudinal direction, a first elastic spring fitted adjacent to the first elastic concrete, a second elastic concrete inserted on another side of the second cylinder to apply an elastic force in a longitudinal direction, a second elastic spring inserted between a baffle plate and an endplate, and a third elastic spring inserted adjacent to the second elastic concrete. Since the damper of Reference 2 includes a plurality of elastic springs and a plurality of elastic concretes, the safety of a structure may be expected to increase through dispersion of vibration energy.

However, when the ductile plastic pipe or the resinous elastic concrete is used, the damper may not be used for a long time and may be limited to a single usage. In particular, the damper of Reference 2 may be structurally complex and large-sized. Thus, there may be an inconvenience in terms of maintenance, and great concern about destroying the beauty of a structure.

SUMMARY

An aspect of the present invention provides a damping device for building seismic reinforcement that may be simply structured to increase performance and durability of a building while preserving the beauty of the building, whereby a reduction in management costs through minimum maintenance may be expected.

Another aspect of the present invention also provides a damping device that may increase a damping force with respect to seismic amplitude through bidirectional damping, rather than unidirectional damping.

According to an aspect of the present invention, there is provided a damping device for building seismic reinforcement, the damping device including a cylindrical body sealed with an inner cover and an outer cover at both ends, a support rod coupled to one end of the cylindrical body to perform an axial motion, the support rod including a moving plate having a damping orifice in the cylindrical body, the support rod including a nut configured to adjust a length of the support rod at an inner side end received in the cylindrical body, and a buffering means configured to store elastic energy in one of a first spring and a second spring based on a moving direction of the moving plate, the buffering means including the first spring inserted in the inner cover, the second spring inserted in the outer cover, and a lubricant in the cylindrical body.

The terms or words used in the description and claims should not be interpreted on a conventional or dictionary basis, but should be interpreted on a meaning and concept basis well matching with the technical concepts of the present invention with the principle that the inventor(s) can properly define the concepts of the terms to explain his or her own invention in the best manner. The embodiments disclosed herein and the configurations shown in the drawings are only the preferred embodiments of the present invention, not expressing the technical concepts of the present invention, so it should be interpreted that there are various alternative equivalents and modifications at the time the application is made.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
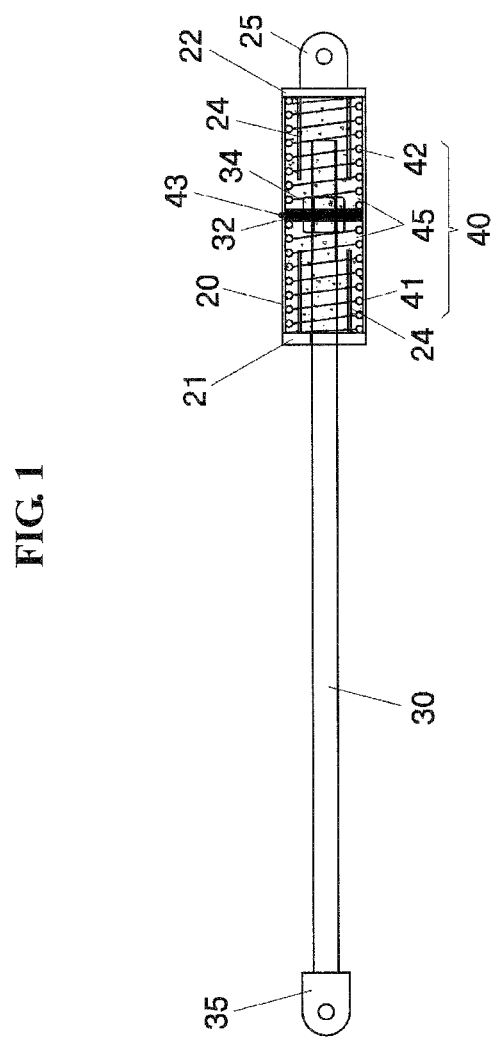
FIG. 1 illustrates a front view of a damping device according to an embodiment of the present invention.
Figure 2:
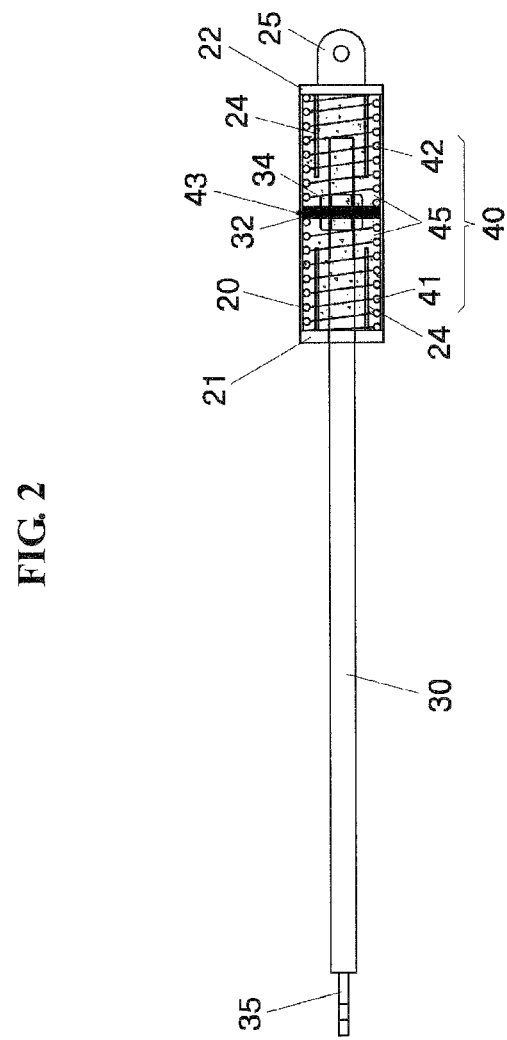
FIG. 2 illustrates a plan view of a damping device according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 3:
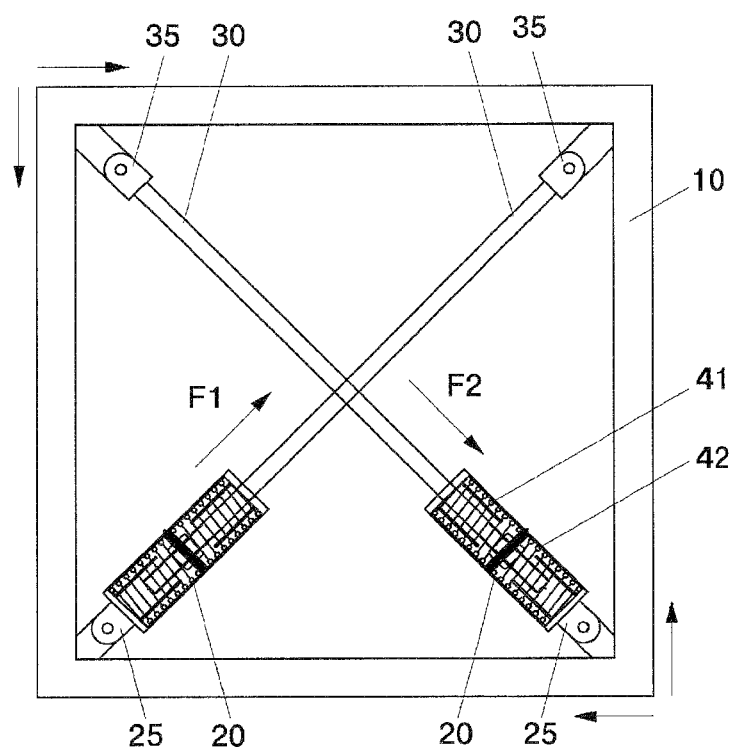
FIGS. 3 and 4 illustrate examples of installations and operations of damping devices according to an embodiment of the present invention.

According to embodiments of the present invention, a damping device may include a cylindrical body 20 sealed with an inner cover 21 and an outer cover 22 at both ends. The cylindrical body 20 may not necessarily have a circular cross-section. The cylindrical body 20 may have an elliptical cross-section or a polygonal cross-section. The inner cover 21 may include a circular through hole through which a support rod 30 may pass. The outer cover 22 may include a lug 25 on an outer surface, in lieu of a through hole. As shown in FIG. 3, the lug 25 may include a through hole configured to fix the damping device to a frame 10 of a building.

The damping device may further include stoppers 24 installed on the inner cover 21 and the outer cover 22 to prevent an up and down motion of the support rod 30. The stoppers 24 may be welded and installed on the inner cover 21 and the outer cover 22 by calculating a deflection based on a design value.

The inner cover 21 may be connected in a manner to be separable for maintenance and inspection, whereas the outer cover 22 may not need to be provided in a separable structure.

The support rod 30 including a moving plate 32 in the cylindrical body 20 may be coupled to one end of the cylindrical body 20 to perform an axial motion. The support rod 30 may include the moving plate 32 at an inner side end received in the cylindrical body 20, and a lug 35 at an outer side end exposed in the cylindrical body 20. As shown in FIG. 3, the lug 35 may include a through hole configured to fix the damping device to the frame 10 of a building. The support rod 30 is not limited to a circular cross-section, except for an area sliding in the inner cover 21. In case a length of the support rod 30 increases, a cross-section advantageous to buckling may be applied. The cross-section of the support rod 30 may be provided in a shape of a circle, a triangle, a rectangle, a polygon, an ellipse, and the like.

The moving plate 32 of the support rod 30 may be supported to slide along an inner surface of the cylindrical body 20. To facilitate an economic increase in durability a material having a wear resistance may be provided on an outer circumference surface of the moving plate 32.

The support rod 30 may include a nut 34 configured to adjust the length of the support rod 30 at an inner side end received in the cylindrical body 20. The support rod 30 may include the nut 34 to be engaged with a screw thread (not assigned a reference numeral) at the inner side end received in the cylindrical body 20 so that the length of the support rod 30 may be adjusted discretionally. By means of the screw thread and the nut 34 of the support rod 30, the length of the support rod 30 may be adjusted discretionally.

A buffering means 40 may include a first spring 41, and a second spring 42 on both sides based on the moving plate 32. The buffering means 40 may be configured to store elastic energy in one of the first spring 41 and the second spring 42 based on a moving direction of the moving plate 32. The buffering means 40 may include the first spring 41 on one side and the second spring 42 on another side based on the moving plate 32 in the cylindrical body 20. The first spring 41 and the second spring 42 may not operate continually as in related arts, but may operate in an alternating manner such that one spring determined to correspond to the moving direction of the support rod 30 may operate. For example, while elastic energy is being stored and released in the first spring 41, the second spring 42 may not operate. Conversely, while elastic energy is being stored and released in the second spring 42, the first spring 41 may not operate.

The moving plate 32 of the support rod 30 may include a damping orifice (not shown). The orifice may be configured to increase a buffer force with respect to the moving plate 32 in a predetermined frequency domain of an external shock wave, for example, an earthquake. Dimensions of the orifice or a number of orifices may be determined based on a seismic damping force of the damping device.

The buffering means 40 may include the first spring 41 inserted in the inner cover 21, the second spring 42 inserted in the outer cover 22, and a lubricant 45 in the cylindrical body 20. The first spring 41 may be inserted in the inner cover 21 at one end, and maintained to be a free end at another end adjacent to the moving plate 32. The second spring 42 may be inserted in the outer cover 22 at one end, and maintained to be a free end at another end adjacent to the moving plate 32. In general, the first spring 41 and the second spring 42 may have equal coefficients of elasticity. However, the relationship between the springs is not limited thereto. Different coefficients of elasticity may be applied. Compression springs may be used for the first spring 41 and the second spring 42.

An inner portion of the cylindrical body 20 may be filled with fluids such as the lubricant 45, as the buffering means 40. The lubricant 45 may increase durabilities of the moving plate 32, the first spring 41, and the second spring 42 and reduce unnecessary operational noise, simultaneously. A nipple 43 may be installed at a portion of the cylindrical body 20 for the lubricant 45 to be periodically injected.

Through the configuration described above, the damping device may be configured to be suitable for a medium or small-sized design in which, for example, a size of the cylindrical body 20 is decreased or increased, the length of the support rod 30 is increased or decreased, and the like.

In FIG. 3, the damping device according to embodiments of the present invention may be installed using the lugs 25 and 35 after the frame 10 is installed using the surface of a wall or a window frame of a building. When two damping devices are installed to intersect in a form of an X, the damping devices may intersect at a portion of the support rods 30 since the size of the cylindrical bodies 20 is small, and thus an installation space may be reduced. When the building in which the damping devices are installed receives seismic shocks of an earthquake, continual deformations of the frame 10, from side to side, may occur. In an instance in which an upper left end and a lower right end of the frame 10 are deformed by an exciting force, an actuating force F1 may be applied and the first spring 41 may be compressed in one damping device and simultaneously, an actuating force F2 may be applied in an opposite direction and the second spring 42 may be compressed in another damping device. In an instance in which the frame 10 is an opposing deformation occurs, the second spring 42 may be compressed in the damping device and the first spring 41 may be compressed in the other damping device.

Although the number of damping devices to be installed is minimized, a damping force may be applied in response to bidirectional deformations of the frame 10. However, since a conventional damping device may store elastic energy unidirectionally, the number of damping devices may increase and the structure may be complex. Thus, considerable expenses may be incurred for maintenance.

Figure 4:
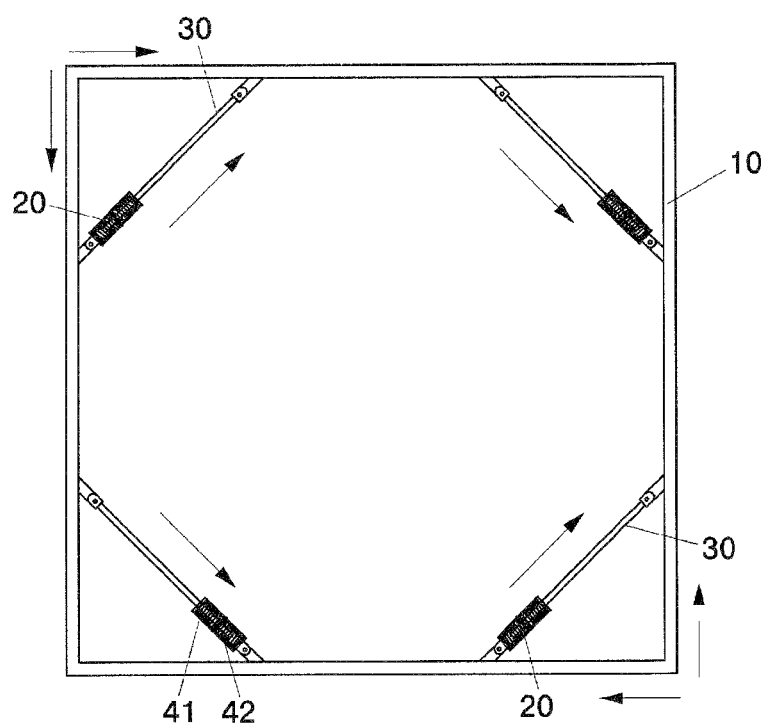
Figure 5A:
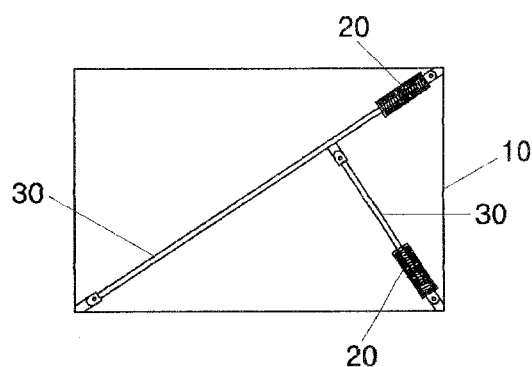
FIGS. 5A through 5D illustrate examples of installations of damping devices according to an embodiment of the present invention.
Figure 5B:
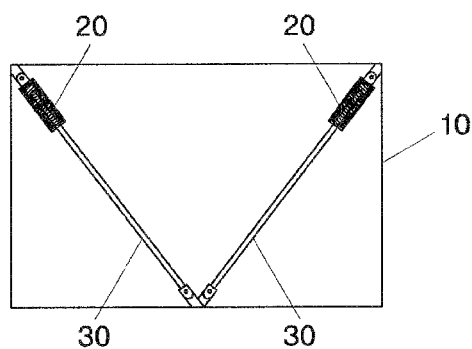
Figure 5C:
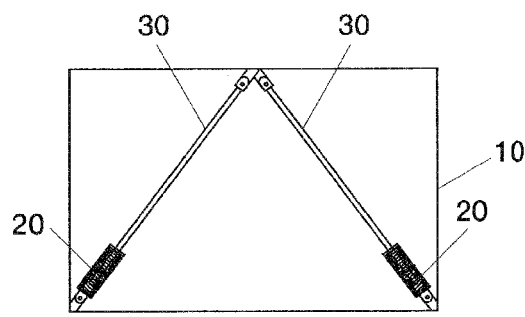
Figure 5D:
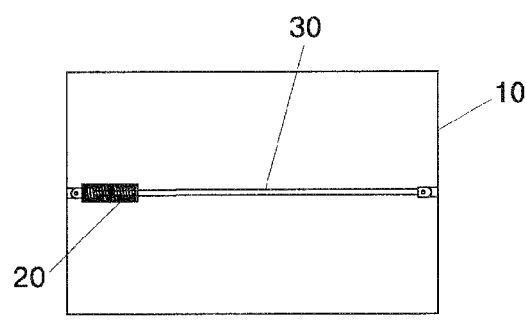

In FIGS. 4 through 5D, when a size of the frame 10 is relatively great or when a size of the damping device is relatively small, the damping device may be installed at each corner based on a shape or the size of the frame 10 in various directions, for example, a diagonal direction, a V direction, a – direction, a λ direction, and the like. Between damping devices facing each other in a diagonal direction, compression states of the first springs 41 or the second springs 42 may be synchronized.

According to embodiments of the present invention, a damping device for building seismic reinforcement may be simply structured to increase the performance and durability of a building while preserving the beauty of the building, and thus a reduction in management costs attributed to minimum maintenance may be expected.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A damping device for building seismic reinforcement, the damping device comprising:
   a cylindrical body sealed with an inner cover and an outer cover at both ends;
   a support rod coupled to one end of the cylindrical body to perform an axial motion, the support rod comprising a moving plate in the cylindrical body, the support rod comprising a nut configured to adjust a length of the support rod at an inner side end received in the cylindrical body; and
   a buffering device configured to store elastic energy in one of a first spring and a second spring based on a moving direction of the moving plate, the buffering device comprising the first spring disposed between the inner cover and the moving plate, the second spring disposed between the outer cover and the moving plate, and a lubricant in the cylindrical body.

\* \* \* \* \*